(12) United States Patent
Heward et al.

(10) Patent No.: US 11,560,326 B2
(45) Date of Patent: Jan. 24, 2023

(54) FLUID TREATMENT SYSTEM AND PROCESS

(71) Applicant: Synergy Watercare Solutions Inc., Lumsden (CA)

(72) Inventors: Ticia L. Heward, Regina (CA); Michael E. Blair, Weyburn (CA); Blaine S. Barbour, Macoun (CA); Duncan C. Hepburn, Scottsdale, AZ (US)

(73) Assignee: Synergy Watercare Solutions Inc., Lumsden (CA)

( * ) Notice: Subject to any disclaimer, the term of this patent is extended or adjusted under 35 U.S.C. 154(b) by 0 days.

(21) Appl. No.: 17/194,734

(22) Filed: Mar. 8, 2021

(65) Prior Publication Data

US 2022/0281763 A1    Sep. 8, 2022

(51) Int. Cl.
*B01D 21/02*    (2006.01)
*C02F 3/12*    (2006.01)
(Continued)

(52) U.S. Cl.
CPC .............. *C02F 3/12* (2013.01); *B01D 21/009* (2013.01); *B01D 21/0042* (2013.01);
(Continued)

(58) Field of Classification Search
CPC ............ B01D 21/0042; B01D 21/0087; B01D 21/009; B01D 21/2405; B01D 21/2444; B01D 21/2472
(Continued)

(56) References Cited

U.S. PATENT DOCUMENTS 1,190,863 A * 7/1916 Come ................ B01D 21/0045
                                                                210/521
2,248,665 A    7/1941 Fisher
(Continued)

FOREIGN PATENT DOCUMENTS

CA    2267677    9/2006
CA    3077953    10/2020
(Continued)

OTHER PUBLICATIONS

European Search Report dated Dec. 10, 2021 for European Patent Application No. 21183283.7, 10 pages.
(Continued)

*Primary Examiner* — Christopher Upton
(74) *Attorney, Agent, or Firm* — Frost Brown Todd LLP

(57) ABSTRACT

A fluid treatment system is provided. A clarification reactor or chamber, configured for receiving an influent, is provided wherein separated water and separated solids may be formed from the influent while inside and/or outside the reactor. An influent inlet, positioned essentially at the top of the reactor, configured to allow the influent to enter the reactor is provided. A separated water outlet is provided, positioned essentially at the top of the reactor, that is configured to allow the separated water to exit the reactor. A solids discharge is also provided, positioned essentially at the bottom of the reactor, that is configured to allow the separated solids to exit the reactor. A downward angled baffle, positioned inside the reactor, is configured to deflect the separated solids towards the solids discharge.

25 Claims, 2 Drawing Sheets

(51) Int. Cl.
*B01D 21/24* (2006.01)
*B01D 21/00* (2006.01)
*C02F 1/00* (2006.01)

(52) U.S. Cl.
CPC ..... *B01D 21/0087* (2013.01); *B01D 21/2444* (2013.01); *B01D 21/2472* (2013.01); *B01D 21/2477* (2013.01); *C02F 2001/007* (2013.01); *C02F 2301/04* (2013.01)

(58) Field of Classification Search
USPC .... 210/801, 803, 187, 519, 521, 523, 532.1, 210/540
See application file for complete search history.

(56) References Cited

U.S. PATENT DOCUMENTS

| | | | |
|---|---|---|---|
| 2,270,616 A * | 1/1942 | Bell | B01D 21/0042 210/532.1 |
| 3,933,654 A | 1/1976 | Middelbeek | |
| 4,024,881 A * | 5/1977 | Weiland | B01D 21/2472 210/523 |
| 4,064,054 A | 12/1977 | Anderson et al. | |
| 4,123,365 A | 10/1978 | Middelbeek | |
| 4,132,652 A | 1/1979 | Anderson et al. | |
| 4,175,312 A | 11/1979 | Tao et al. | |
| 4,469,582 A | 9/1984 | Sublette et al. | |
| 4,747,948 A | 5/1988 | North | |
| 4,913,819 A * | 4/1990 | Patterson | B01D 21/2466 210/523 |
| 5,453,197 A * | 9/1995 | Strefling | B01D 21/003 210/534 |
| 5,503,747 A * | 4/1996 | Vion | B01D 21/2444 210/519 |
| 5,531,890 A | 7/1996 | Keenan | |
| 5,679,265 A | 10/1997 | Schie | |
| 5,774,816 A | 6/1998 | Fontenot et al. | |
| 6,902,667 B1 | 6/2005 | Dunne | |
| 7,544,303 B2 * | 6/2009 | Frink | B01D 21/2427 210/801 |
| 8,945,395 B2 * | 2/2015 | Tweit | B01D 21/0042 210/519 |
| 8,968,571 B2 | 3/2015 | Lee et al. | |
| 9,643,107 B2 | 5/2017 | Buckner | |
| 10,343,089 B2 | 7/2019 | Lewis et al. | |
| 10,918,975 B1 | 2/2021 | Happel | |
| 2007/0170117 A1 * | 7/2007 | Slough | E21B 21/065 210/521 |
| 2011/0042328 A1 * | 2/2011 | Hill | B01D 21/009 210/187 |
| 2015/0027963 A1 * | 1/2015 | Onstad | B01D 21/2416 210/801 |
| 2015/0273361 A1 | 10/2015 | Buckner | |
| 2019/0060795 A1 * | 2/2019 | Bulekbay | B01D 21/0042 |
| 2020/0339448 A1 | 10/2020 | Barbour et al. | |

FOREIGN PATENT DOCUMENTS

| | | |
|---|---|---|
| CN | 211078701 | 7/2020 |
| EP | 0 286 707 A1 | 10/1998 |
| JP | 2020 062612 | 4/2020 |
| WO | WO 1998/023351 | 6/1998 |
| WO | WO 2009/129590 | 10/2009 |

OTHER PUBLICATIONS

International Search Report and Written Opinion dated Apr. 6, 2022 for International Application No. PCT/CA2022/050324, 10 pages.

* cited by examiner

FLUID TREATMENT SYSTEM AND PROCESS

FIELD

The present invention relates fluid treatment systems and processes, and specifically to fluid treatment systems wherein solids are removed from a fluid.

BACKGROUND

It is well known in the art of fluid treatment that the removal of solids from a liquid may be accomplished by allowing a suspended solid material to settle downwards due to gravitational forces. After settling has occurred, the at least partially clarified liquid can be removed by a variety of means. It also known that chemicals, such as coagulation agents, may be added to modify the solid material so that settling of the solids occurs more readily.

There are, however, many known drawbacks when employing processes that allow suspended solid material to settle downwards as a means for fluid treatment. It has long been recognized that the settling of solids, depending on the composition of the solid material and/or fluid, may be time consuming and thereby impractical as a means for separating solid material. Further, settled solid material may tend to clump or adhere to an inner surface of a settling chamber making it difficult to remove the settled solid material form the settling chamber.

One solution is to employ structures that direct settled solid material towards an outlet or discharge assembly.

For example, United States Patent Application Publication No. 2020/0339448A1 to Barbour et al. ("Barbour"), the contents of which are herein explicitly incorporated by reference in its entirety, describes fluid treatment systems for removal of solid matter from water or other fluids. A chemical or chemicals are introduced into the fluid under pressure to coagulate and/or conglomerate the solid materials and cause them to be dropped out of the treatment system and be removed by existing a discharge assembly located at the bottom of the system.

The fluid treatment system described in Barbour comprises an equalization chamber and a clarification chamber, both having conical bases allowing settled solid material to be directed towards the discharge assemblies located at the bottom of each chamber.

Systems such as those contemplated by Barbour, however, may have some drawbacks. For example, some embodiments, such as those contemplated by Barbour, are restricted to having settling chambers that comprise conical shaped bases allowing settled solid material to be directed towards the discharge assemblies located at the bottom of each chamber.

Further, depending of the make-up of the settled solid material and its tendency to adhere to surfaces, the settled solid material may adhere to the inner surfaces of the conical shaped bases, as they are outwardly angled upwards, thereby potentially causing clumping that may prevent solid material to further move towards the discharge assemblies located at the bottom of each chamber.

U.S. Pat. No. 9,643,107 to Buckner ("Buckner"), the contents of which are herein explicitly incorporated by reference in its entirety, addresses some of the above-mentioned drawbacks. Buckner describes a system to separate solids from liquids. The system includes a series of alternating baffles disposed along a length of a tank, where the series of alternating baffles define a vertical tortuous flow path of the fluid from a first end of the tank to a second end of the tank to cause solids to settle out of the fluid. The alternating baffles each have a sloped planar surface disposed between a lower horizontal planar surface and an upper horizontal planar surface to cause at least one eddy in a vertical plane as the fluid flows through the tank. The system may also include a series of tanks in fluid communication with the at least one tank and secured side by side, where the solids progressively settle out from the fluid in stages as the fluid passes from one tank to another in series.

Systems such as those contemplated by Buckner, however, may also have some drawbacks. For example, the angled baffles members contemplated by Buckner do not direct solid material towards an outlet or discharge assembly possibly making it difficult to remove the solid material form the settling chamber.

What is needed, therefore, is a fluid treatment system that is relatively simple and robust in construction, while providing means for ensuring settled solid materials are directed towards an outlet or discharge assembly of a settling chamber.

SUMMARY

According to a first broad aspect of the invention, there is provided a system for fluid treatment, the system comprising: a clarification reactor receiving an influent, the reactor having a first end, a second end, a top and a bottom; an influent inlet, positioned essentially at the top, configured to allow the influent to enter the reactor; a separated water outlet, positioned essentially at the top, allowing separated water to exit the reactor; a first solids discharge, positioned essentially at the bottom, configured to allow separated solids to exit the reactor; and a downward angled baffle, positioned inside the reactor, configured to deflect the separated solids towards the first solids discharge; wherein the separated water and the separated solids are formed from the influent while inside and/or outside the reactor.

According to a second broad aspect of the invention, there is provided a process for fluid treatment, the process comprising the steps of: allowing an influent to enter a clarification reactor; allowing separated solids inside the reactor and separated water inside the reactor to at least partially separate from each other;

deflecting the separated solids downwards towards a solids discharge; allowing the separated solids to exit the reactor via the solids discharge; allowing the separated water to exit the reactor via a separated water outlet; and allowing the influent to form the separated water and the separated solids while inside and/or outside the reactor.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements.

Figure 1:
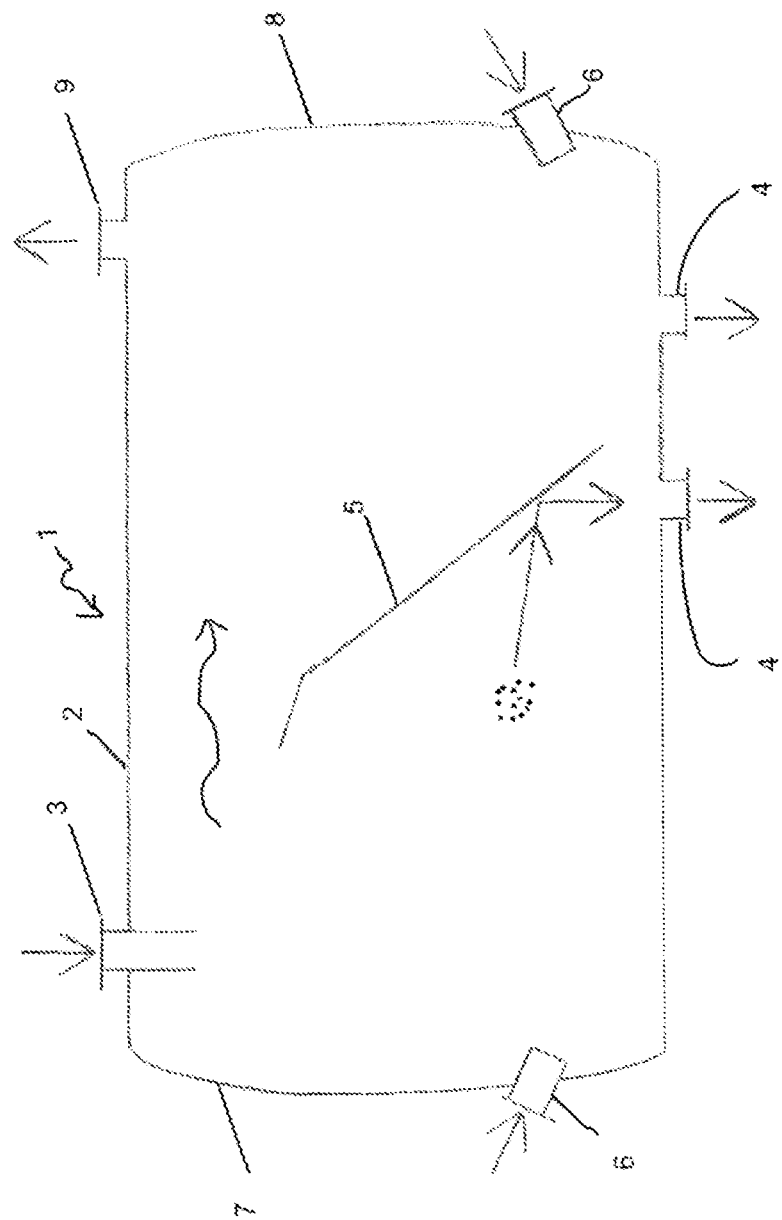
FIG. 1 is a cross sectional view of a first exemplary embodiment of the present invention.

The drawings are not intended to be limiting in any way, and it is contemplated that various embodiments of the invention may be carried out in a variety of other ways, including those not necessarily depicted in the drawings.

The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

Throughout the following description specific details are set forth in order to provide a more thorough understanding to persons skilled in the art. However, well known elements may not have been shown or described in detail to avoid unnecessarily obscuring the disclosure. The following description is not intended to be exhaustive or to limit the invention to the precise form of any exemplary embodiment. Accordingly, the description and drawings are to be regarded and interpreted in an illustrative, rather than a restrictive, sense.

I. EXEMPLARY SYSTEM AND PROCESS FOR FLUID TREATMENT

The present invention is directed to a system for fluid treatment system. The system comprises a clarification reactor or chamber configured for receiving an influent. Separated water and separated solids may be formed from the influent while inside and/or outside the reactor.

The term "influent" may include, but is not limited to, wastewater or other liquid mixtures that require solids to be separated from.

The term "reactor" may include, but is not limited to, vessels or chambers configures for receiving the influent.

An influent inlet, positioned essentially at the top of the reactor, is configured to allow the influent to enter the reactor. A separated water outlet is provided, positioned essentially at the top of the reactor, that is configured to allow the separated water to exit the reactor. A solids discharge is also provided, positioned essentially at the bottom of the reactor, that is configured to allow the separated solids to exit the reactor. A downward angled baffle, positioned inside the reactor, is configured to deflect the separated solids towards the solids discharge.

Turning to FIG. 1, an exemplary embodiment of the present invention is illustrated.

A system 1 for treating a fluid is provided. The fluid may be referred as an influent and may be composed of water and waste materials. The present invention is directed to a means for separating at least a portion of the waste materials from the water allowing for separated water to be further processed and collected.

The influent may further comprise chemicals for assisting in the treatment process. Some chemicals may include, but are not limited to, coagulation agents that assist in the coagulation of and/or formation of solid material within the influent. Some coagulation agents may include, but are not limited to, polyaluminum chloride and polymer based agents. Such chemicals may be injected into the influent before the influent enters the reactor (herein described below) or while the influent is inside the reactor.

A reactor 2 is provided that receives the influent. As shown in FIG. 1, the reactor may be an elongated structure having a first end 7 and second end 8. The reactor 2 receives the influent at an influent inlet 3 positioned at or near the top of the reactor 2 and at or near the first end 7 of the reactor 2. The reactor may be made of steel walls or other suitable materials that would be known those skilled in the art.

The system 1 may also include a pump (not shown) for pumping the influent into the reactor 2 from an influent source. The influent may be pumped and travel inside a transfer conduit (not shown) before entering the reactor 2.

The pump may also pump the influent at a certain pressure such that the any fluid inside the reactor is at a certain pressure. Preferably, clarification reactor 2 receives the influent at a pressure between 14.9 psi and 500 psi. It is also preferable that the clarification reactor 2 maintains and holds the influent at a pressure between 14.9 psi and 500 psi.

As influent enters the reactor 2, water and solids from the influent may begin to form and/or separate. In some embodiments, the water and solids of the influent may separate or at least partially separate before the influent enters the reactor 2. In other words, the separated water and separated solids are formed from the influent while inside and/or outside the reactor 2. Solid separation may be assisted by the addition coagulation agents that assist in the coagulation of and/or formation of solid material within the influent as discussed herein above.

At least one solids discharge 4 is provided, at or near the bottom of the reactor 2, configured to allow separated solids to exit the reactor.

At least one downwardly angled baffle 5 is provided inside the reactor 2. As shown in FIG. 1, the angled baffle 5 is angled downwardly in a direction from the first end 7 to the second end 8 of the reactor 2. Those skilled in the art would know of numerous mounting means for mounting the baffle inside the reactor 2

After entering the influent enters the reactor 2, the separated water and the separated solids will flow in the direction from the first end 7 of the reactor 2 to the second end 8 of the reactor 2. The effective follow rate may decrease as the influent travels form the transfer conduit to the reactor 2 due to the increase of volume of the reactor. While inside the reactor 2, the separated solids may also tend to travel downwards and settle towards the bottom region of the reactor resulting in at least a portion of at least partially separated water to remain in the top region of the reactor 2. As the separated solids travel inside the reactor 2, at least a portion of the separated solids may impact the angled baffle 5 whereby the separated solids are deflected downwardly towards the solids discharge 4. The angled baffle 5 is configured for deflecting the solids towards the position of the solids discharge 4. Such angled baffle 5 configurations may include angle and position of the baffle 5. In some embodiments, baffle 5 configuration may be adjustable by means that would be known to those skilled in the art. In some embodiments, a plurality of angled baffles 5 and solids discharges 4 are provided for sequentially deflecting solids towards a solids discharge 4 thereby potentially removing more solids from the separated water and increasing the purity of the separated water.

Preferably no baffles are configured to deflect the separated solids upwards as this may mix the separated solids with the separated water.

The separated solids may exit the reactor 2 via the solids discharge 4 and the separated water may exit the water via am at least one separated water outlet 9 which is provided, at or near the top of the reactor 2 and at or near the second end 8 of the reactor 2, for allowing separated water to exit the reactor 2. Solids discharges and water outlets suitable for the present invention are known to this skilled in the art. For example, United States Patent Application Publication No. 2020/0339448A1 to Barbour et al., the contents of which are herein explicitly incorporated by reference in its entirety, contemplates solid discharges and water outlets employed for a fluid treatment system. In some embodiments, solid discharges and water outlets may comprise valve systems, suitable to be employed for the present invention that would be known to those skilled in the art.

In some embodiments, that system 1 may further include a flush port 6, positioned essentially at an or near an end of the reactor 2, for injecting a fluid towards the bottom of the reactor 2 thereby displacing at least a portion of the separated solids, that may have settled on the bottom of the reactor 2, towards the solids discharge 4. As shown in FIG. 1, a flush port 6 is provided at or near the first end 7 of the reactor 2 and at or near the second end 8 of the reactor 2. Preferably, the flush ports 9 inject a fluid at a pressure greater than the pressure the clarification reactor 2 holds the influent. More preferably, the flush ports 6 inject a fluid at a pressure 0.5 psi greater than the pressure the clarification reactor 2 holds the influent. Flush ports that would be suitable to be employed for the present invention are known to those skilled in the art.

In some embodiments, that system 1 may also include heating means (not shown) for heating the reactor 2. Preferably, the heating means are configured to heat the reactor 2 to a temperature between 5 to 75 degrees Celsius. In some situations, heating of the reactor 2 may be necessary to assist in the coagulation of and/or formation of solid material within the influent and/or separation of the solids form the water. Heating means that would be suitable to be employed for the present invention are known to those skilled in the art.

II. ALTERNATE EXEMPLARY SYSTEM AND PROCESS FOR FLUID TREATMENT

Figure 2:
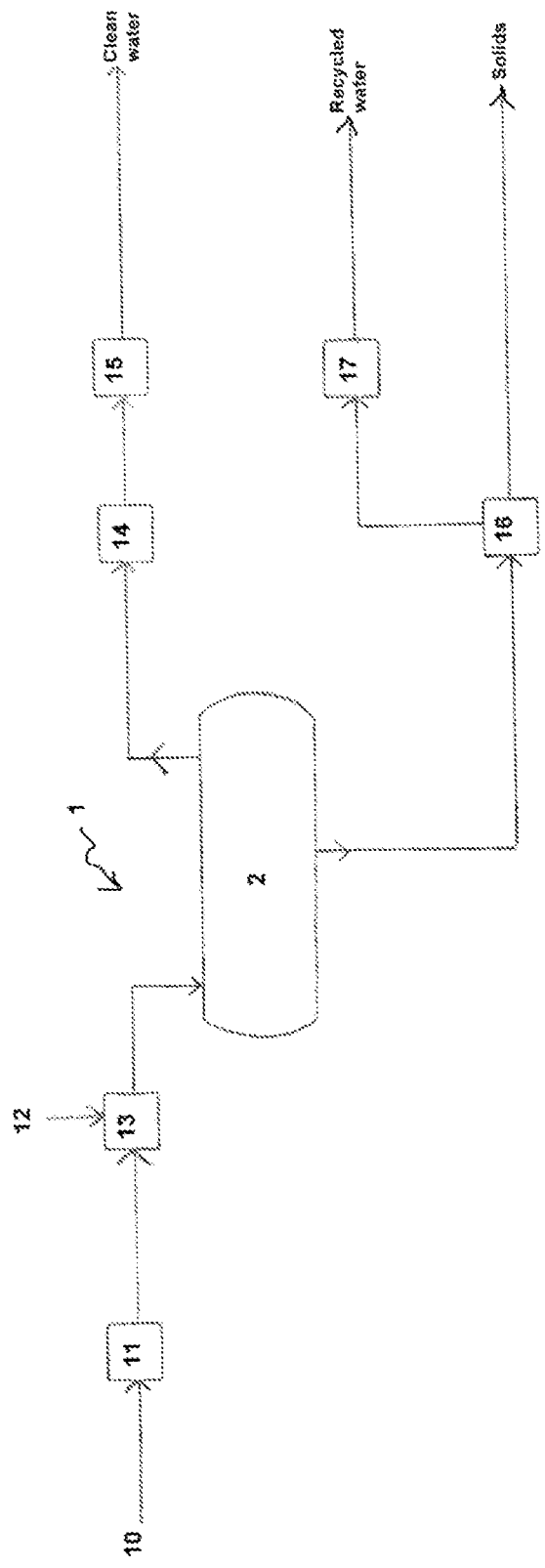
FIG. 2 is a schematic view of a second exemplary embodiment of the present invention.

Turning to FIG. 2, another exemplary embodiment of the present invention is illustrated.

As discussed herein below, in some exemplary embodiments, the influent may be involved in processing steps before entering the reactor 2. For example, United States Patent Application Publication No. 2020/0339448A1 to Barbour et al., the contents of which are herein explicitly incorporated by reference in its entirety, contemplates some of these steps.

As discussed herein above, a pump (not shown) may be provided for pumping the influent from an influent source. Before entering the reactor 2, the influent 10 may pass through a macerator 11 that reduces solids to small pieces or a slurry. Maceration may be achieved by using a chopper pump.

Before entering the reactor 2 (as described above), the influent may also have chemicals 12 injected into it before or while passing through a mixer 13. Flocculants, Polymers, Neutralizing agents, pH conditioners, coagulation agents, and disinfectants may be added to the influent stream and mixed. United States Patent Application Publication No. 2020/0339448A1 to Barbour et al., the contents of which are herein explicitly incorporated by reference in its entirety, contemplates chemical agents and injections means that may be suitable for the present invention.

As discussed herein below, in some exemplary embodiments, the separated water may be involved in processing steps after exiting the reactor 2. Such steps may include, but are not limited to, sterilization, via sterilization means 14, by employing UV light, ozone and/or chemical disinfectants, and filtration, via filtration means 15, by employing filter pots, sand filters and/or reverse osmosis.

As discussed herein below, in some exemplary embodiments, the separated solids may be involved in processing steps after exiting the reactor 2. Such steps may include, but are not limited to, de-watering, via de-watering means 16, wherein the removed water may be pumped via a pump 17 and recycled for a specific purpose. De-watering may be achieved by employing a screen press, belt press, screw press and/or centrifuge.

III. EXEMPLARY COMBINATIONS

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A fluid treatment system comprising: a clarification reactor receiving an influent, the reactor having a first end, a second end, a top and a bottom; an influent inlet, positioned essentially at the top, configured to allow the influent to enter the reactor; a separated water outlet, positioned essentially at the top, allowing separated water to exit the reactor; a first solids discharge, positioned essentially at the bottom, configured to allow separated solids to exit the reactor; and a downward angled baffle, positioned inside the reactor, configured to deflect the separated solids towards the first solids discharge; wherein the separated water and the separated solids are formed from the influent while inside and/or outside the reactor.

Example 2

The fluid treatment system of Example 1, wherein the influent comprises a coagulation agent that allows the influent to form the separated water and the separated solids.

Example 3

The fluid treatment system of any one or more of Example 1 through Example 2, wherein the influent comprises solids and water that form the separated water and the separated solids.

Example 4

The fluid treatment system of any one or more of Example 1 or Example 3, wherein the separated solids are a sludge.

Example 5

The fluid treatment system of any one or more of Example 1 through Example 4, wherein the baffle is angled downwardly from the first end to the second end.

Example 6

The fluid treatment system of any one or more of Example 1 through Example 5, wherein the first solids discharge is positioned closer to the first end than the baffle.

Example 7

The fluid treatment system of Example 6, wherein the influent inlet is positioned closer to the first end than the first solids discharge.

Example 8

The fluid treatment system of Example 7, wherein the separated water outlet is positioned further from the first end than the baffle.

Example 9

The fluid treatment system of Example 7, further comprising a second solids discharge, positioned essentially at the bottom and further from the first end than the baffle, configured to allow the separated solids to exit the reactor.

Example 10

The fluid treatment system of any one or more of Example 1 through Example 9, wherein the clarification reactor receives the influent at a pressure between 14.9 psi and 500 psi.

Example 11

The fluid treatment system of Example 10, wherein the clarification reactor contains the influent at a pressure between 14.9 psi and 500 psi.

Example 12

The fluid treatment system of any one or more of Example 1 through Example 11, wherein the baffle has two sections; each section angled downwardly from the first end to the second end at different angles.

Example 13

The fluid treatment system of any one or more of Example 1 through Example 12, further comprising a first flush port, positioned essentially at the first end, for injecting a first fluid towards the bottom thereby displacing any separated solids that settled on the bottom towards the first solids discharge.

Example 14

The fluid treatment system of Example 13, wherein the first flush port injects the first fluid at a pressure 0.5 psi greater than pressure the clarification reactor contains the influent.

Example 15

The fluid treatment system of any one or more of Example 1 through Example 14, further comprising a second flush port, positioned essentially at the second end, for injecting a second fluid towards the bottom thereby displacing any separated solids that settled on the bottom towards the second solids discharge.

Example 16

The fluid treatment system of Example 15, wherein the second flush port injects the second fluid at a pressure 0.5 psi greater than pressure the clarification reactor contains the influent.

Example 17

The fluid treatment system of any one or more of Example 1 through Example 16, wherein the reactor is an elongated structure elongated from the first end to second end.

Example 18

The fluid treatment system of any one or more of Example 1 through Example 17, further comprising heating means for heating the reactor to a temperature between 5 to 75 degrees Celsius.

Example 19

The fluid treatment system of any one or more of Example 1 through Example 18, wherein no baffles configured to deflect the separated solids upwards are present.

Example 20

A process for fluid treatment, the process comprising the steps of: allowing an influent to enter a clarification reactor; allowing separated solids inside the reactor and separated water inside the reactor to at least partially separate from each other; deflecting the separated solids downwards towards a solids discharge; allowing the separated solids to exit the reactor via the solids discharge; allowing the separated water to exit the reactor via a separated water outlet; and allowing the influent to form the separated water and the separated solids while inside and/or outside the reactor.

Example 21

The process of Example 20, wherein the influent comprises a coagulation agent that allows the influent to form the separated water and the separated solids.

Example 22

The process of Example 20 or Example 21, wherein the influent comprises solids and water that form the separated water and the separated solids.

Example 23

The process of any one or more of Example 20 through Example 22, wherein the clarification reactor receives the influent at a pressure between 14.9 psi and 500 psi.

Example 24

The process of any one or more of Example 20 through Example 23, wherein the clarification reactor holds the influent at a pressure between 14.9 psi and 500 psi.

Example 25

The process of any one or more of Example 20 through Example 24, further comprising the step of injecting a fluid towards a bottom of the reactor thereby displacing any separated solids that settled on the bottom towards the solids discharge.

Example 26

The process of Example 25, wherein the fluid is injected at a pressure 0.5 psi greater than the pressure the clarification reactor contains the influent.

Example 27

The process of any one or more of Example 20 through Example 26, further comprising the step of heating contents of reactor to a temperature between 5 to 75 degrees Celsius.

IV. MISCELLANEOUS

Unless the context clearly requires otherwise, throughout the description and the "comprise", "comprising", and the like are to be construed in an inclusive sense, as opposed to an exclusive or exhaustive sense; that is to say, in the sense of "including, but not limited to;"

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification shall refer to this specification as a whole and not to any particular portions of this specification;

"or", in reference to a list of two or more items, covers all of the following interpretations of the word: any of the items in the list, all of the items in the list, and any combination of the items in the list; and the singular forms "a", "an" and "the" also include the meaning of any appropriate plural forms.

Words that indicate directions such as "vertical," "transverse," "horizontal," "upward," "downward," "forward," "backward," "inward," "outward," "vertical," "transverse," "left," "right," "front," "back," "top," "bottom," "below," "above," "under," and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of methods and apparatus have been described herein for purposes of illustration. These are only examples. The invention provided herein can be applied to contexts other than the exemplary contexts described above.

Many alterations, modifications, additions, omissions and permutations are possible within the practice of this invention. This invention includes variations on described embodiments that would be apparent to the skilled person, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The foregoing is considered as illustrative only of the principles of the invention. The scope of the claims should not be limited by the exemplary embodiments set forth in the foregoing but should be given the broadest interpretation consistent with the specification as a whole.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A fluid treatment system comprising:
   a clarification reactor receiving an influent, the reactor having a first end, a second end, a top and a bottom;
   an influent inlet, positioned essentially at the top, configured to allow the influent to enter the reactor;
   a separated water outlet, positioned essentially at the top, allowing separated water to exit the reactor;
   a first solids discharge, positioned essentially at the bottom, configured to allow separated solids to exit the reactor; and
   a downward angled baffle, positioned inside the reactor, configured to deflect the separated solids towards the first solids discharge, wherein the baffle has two sections, each section angled downwardly from the first end to the second end at different angles;
   wherein the separated water and the separated solids are formed from the influent while inside and/or outside the reactor.

2. The fluid treatment system according to claim 1, wherein the influent comprises a coagulation agent that allows the influent to form the separated water and the separated solids.

3. The fluid treatment system according to claim 1, wherein the influent comprises solids and water that form the separated water and the separated solids.

4. The fluid treatment system according to claim 1, wherein the separated solids are a sludge.

5. The fluid treatment system according to claim 1, wherein the first solids discharge is positioned closer to the first end than the baffle.

6. The fluid treatment system according to claim 5, wherein the influent inlet is positioned closer to the first end than the first solids discharge.

7. The fluid treatment system according to claim 6, wherein the separated water outlet is positioned further from the first end than the baffle.

8. The fluid treatment system according to claim 6, further comprising a second solids discharge, positioned essentially at the bottom and further from the first end than the baffle, configured to allow the separated solids to exit the reactor.

9. The fluid treatment system according to claim 1, wherein the clarification reactor receives the influent at a pressure between 14.9 psi and 500 psi.

10. The fluid treatment system according to claim 9, wherein the clarification reactor contains the influent at a pressure between 14.9 psi and 500 psi.

11. The fluid treatment system according to claim 1, further comprising a first flush port, positioned essentially at the first end, for injecting a first fluid towards the bottom thereby displacing any separated solids that settled on the bottom towards the first solids discharge.

12. The fluid treatment system according to claim 11, wherein the first flush port injects the first fluid at a pressure 0.5 psi greater than pressure the clarification reactor contains the influent.

13. The fluid treatment system according to claim 1, further comprising a second flush port, positioned essentially at the second end, for injecting a second fluid towards the bottom thereby displacing any separated solids that settled on the bottom towards the second solids discharge.

14. The fluid treatment system according to claim 13, wherein the second flush port injects the second fluid at a pressure 0.5 psi greater than pressure the clarification reactor contains the influent.

15. The fluid treatment system according to claim 1, wherein the reactor is an elongated structure elongated from the first end to second end.

16. The fluid treatment system according to claim 1, further comprising heating means for heating the reactor to a temperature between 5 to 75 degrees Celsius.

17. The fluid treatment system according to claim 1, wherein no baffles configured to deflect the separated solids upwards are present.

18. A process for fluid treatment, the process comprising the steps of:
    allowing an influent to enter a clarification reactor having a first end and a second end;
    allowing separated solids inside the reactor and separated water inside the reactor to at least partially separate from each other;
    deflecting the separated solids downwards towards a solids discharge with a downward angled baffle positioned inside the reactor, wherein the baffle has two sections, each section angled downwardly from the first end to the second end at different angles;
    allowing the separated solids to exit the reactor via the solids discharge;
    allowing the separated water to exit the reactor via a separated water outlet; and
    allowing the influent to form the separated water and the separated solids while inside and/or outside the reactor.

19. The process according to claim 18, wherein the influent comprises a coagulation agent that allows the influent to form the separated water and the separated solids.

20. The process according to claim 18, wherein the influent comprises solids and water that form the separated water and the separated solids.

21. The process according to claim 18, wherein the clarification reactor receives the influent at a pressure between 14.9 psi and 500 psi.

22. The process according to claim 18, wherein the clarification reactor holds the influent at a pressure between 14.9 psi and 500 psi.

23. The process according to claim 18, further comprising the step of: injecting a fluid towards a bottom of the reactor thereby displacing any separated solids that settled on the bottom towards the solids discharge.

24. The process according to claim 23, wherein the fluid is injected at a pressure 0.5 psi greater than the pressure the clarification reactor contains the influent.

25. The process according to claim 18, further comprising the step of: heating contents of reactor to a temperature between 5 to 75 degrees Celsius.

* * * * *